United States Patent [19]

Harada et al.

[11] 4,342,859
[45] Aug. 3, 1982

[54] BIS(AMINOPHENYLTHIOALKYL)TEREPH-THALATE AND HARDENER FOR POLYURETHANE ELASTOMER THEREOF

[75] Inventors: Takao Harada, Shizuoka; Hideaki Ohashi, Fujieda; Wataro Koike, Shizuoka; Chihiro Yazawa, Yokohama; Kazuko Nanjo, Tokorozawa, all of Japan

[73] Assignee: Ihara Chemical Industry Co., Ltd., Tokyo, Japan

[21] Appl. No.: 153,417

[22] Filed: May 27, 1980

[51] Int. Cl.³ .................... C08G 18/32; C07C 69/82
[52] U.S. Cl. ..................................... 528/64; 525/454; 560/85
[58] Field of Search ..................... 560/85; 260/30.8 R, 260/45.85 T; 525/454; 528/64

[56] References Cited

U.S. PATENT DOCUMENTS 3,875,127 4/1975 Radlmann et al. ................. 560/85
4,035,337 7/1977 Herweh et al. ..................... 560/85

FOREIGN PATENT DOCUMENTS 55-38335 3/1980 Japan.

Primary Examiner—Natalie Trousof
Assistant Examiner—Vera C. Clarke
Attorney, Agent, or Firm—Oblon, Fisher, Spivak, McClelland & Maier

[57] ABSTRACT

Bis(aminophenylthioalkyl)terephthalate having the formula

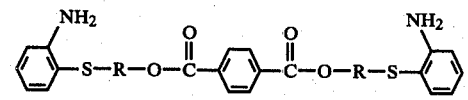

wherein R represents a $C_1$-$C_3$ alkyl group. The compounds are useful as hardeners for a polyurethane elastomer.

2 Claims, No Drawings

BIS(AMINOPHENYLTHIOALKYL)TEREPHTHALATE AND HARDENER FOR POLYURETHANE ELASTOMER THEREOF

BACKGROUND OF THE INVENTION

1. Field of the Invention

The present invention relates to novel, useful bis(2-aminophenylthioalkyl)terephthalates and hardeners for polyurethane elastomer thereof.

2. Description of the Prior Arts

Heretofore, aromatic diamines have been used as hardeners in a preparation of a polyurethane elastomer because high mechanical characteristics are imparted by urea group or biuret group formed by a reaction of isocyanate group of a prepolymer with amino group of an aromatic diamine. A special expensive prepolymer such as 1,5-naphthalenediisocyanate should be used in the case of a diol type hardener. On the other hand, a polyurethane elastomer having excellent mechanical property can be obtained even though a prepolymer having isocyanate group which is industrially available, is used in the case of the aromatic diamine. Therefore, various aromatic diamine type hardeners have been proposed. Various conditions are, however, considered for the hardener to obtain a desired aromatic diamine type hardener.

The important factors required for the hardeners are as follows.

Firstly, it should be low melting point solid or liquid from the viewpoint of processability, labour hygiene and energy saving.

Secondly, a pot life as the time from mixing a hardener with a mixture of polyisocyanate and polyol or a prepolymer having the terminal isocyanate group to non-flowing the mixture for casting, is suitable.

Thirdly, a set time as the demoldable time from molding the mixture to demolding the casted product from the viewpoint of processability especially efficiency is suitable.

Fourthly, the object hardener is easily produced and it is stable.

Fifthly, the resulting polyurethane elastomer has excellent physical property.

However, these requirements are contradictory for example, if the short set time is required, the pot life is shortened to cause a trouble in the processing. Accordingly, it is difficult to obtain a hardener having satisfactory and balanced characteristics.

For example, when 1,2-bis(2-aminophenylthio)ethane is used as a hardener, a polyurethane elastomer having relatively improved mechanical characteristics can be obtained, but a pot life is too short to give a desired processability. This compound can not be a hardener having balanced characteristics.

The inventors have studied syntheses of various compounds for finding hardeners having satisfactory characteristics for polyurethane elastomers.

SUMMARY OF THE INVENTION

It is an object of the present invention to provide hardeners for a polyurethane elastomer which have the above-mentioned balanced characteristics.

The present invention is to provide bis(aminophenylthioalkyl)terephthalates having the formula

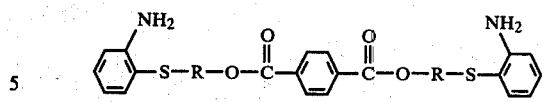

wherein R represents a $C_1$–$C_3$ alkyl group which is useful as a hardener for a polyurethane elastomer.

DETAILED DESCRIPTION OF THE PREFERRED EMBODIMENTS

In the bis(aminophenylthioalkyl)terephthalates having the formula

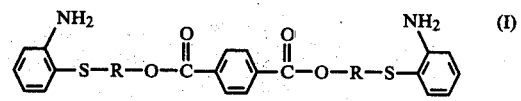 (I)

the group R is a $C_1$–$C_3$ alkyl group such as methyl, ethyl and propyl group.

The novel compounds include bis(2-aminophenylthioethyl)terephthalate, bis(2-aminophenylthiopropyl)terephthalate, bis(2-aminophenylthiomethyl)terephthalate, bis[$\beta$-(2-aminophenylthio)-$\alpha$-methylethyl]terephthalate and bis[$\beta$-(2-aminophenylthio)-$\beta$-methyl-ethyl]terephthalate.

The novel compounds of the present invention of bis(2-aminophenylthioalkyl)terephthalates can be produced by reacting 2-nitrothiophenol having the formula

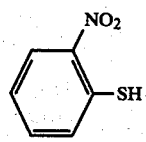

with a haloalcohol having the formula

X—R—OH wherein R represents a $C_1$–$C_3$ alkyl group and X represents a halogen atom under refluxing to obtain hydroxyalkylthionitrobenzene having the formula

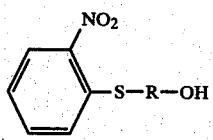 (Reaction I)

and then, reacting the product with terephthaloyl halide having the formula

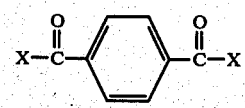

to obtain bis(nitrophenylthioalkyl)terephthalate having the formula (Reaction II)

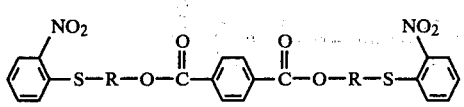

and then, reducing the product to obtain the object compound (Reaction III).

In Reaction I, the reaction is carried out by using slightly excess of the haloalcohol to 2-nitrothiophenol in the presence of a dehydrohalogenating agent such as an organic triamine or an inorganic base such as trimethylamine, triethylamine, pyridine, sodium hydroxide, potassium hydroxide and sodium carbonate, under refluxing.

The haloalcohol can be halomethanols, haloethanols and halopropanols. The halogen atom is preferably chlorine or bromine atom.

In Reaction II, a stoichiometric amount of the terephthaloyl halide is added to the 2-hydroxyalkylthionitrobenzene at a low temperature in a solvent such as benzene, toluene and xylene in the presence of the dehydrohalogenating agent and the mixture is heated with stirring for several hours. The terephthaloyl halide can be terephthaloyl chloride, bromide etc.

In Reaction III, the conventional reduction such as the reduction using a catalytic amount of an acid with iron powder is employed. A mixture of iron powder, an acid such as acetic acid and hydrochloric acid and a solvent such as water, benzene, toluene and xylene is added to a solution of bis(2-nitrophenylthioalkyl)-terephthalate in a solvent such as benzene, toluene and xylene and the mixture is refluxed for several hours under refluxing.

After the reactions, the reaction mixture is treated by the conventional method to obtain bis(2-aminophenylthioalkyl)terephthalate as the object product.

In the manufacture of polyurethan elastomer by using the novel compound of the present invention as the hardener, the hardener of the compound (I) in a molten condition is added to a heated reaction mixture of a polyisocyanate with a polyol or a polyurethane prepolymer having terminal isocyanate groups or a polyisocyanate is added to a mixture of a polyol and the hardener of the compound (I) and then, the mixture is thoroughly mixed and poured into a casting mold and it is hardened.

Suitable polyisocyanates used in the manufacture, include hexamethylene diisocyanate (HMDI) cyclohexane diisocyanate, 2,4-tolylene diisocyanate (2,4-TDI), 2,6-tolylene diisocyanate (2,6-TDI), and a mixture of 2,4-TDI and 2,6-TDI, dimer and trimer of 2,4-tolylene diisocyanate, xylylene diisocyanate (XDI), meta-xylylene diisocyanate (MXDI), m-phenylene diisocyanate, 4,4'-biphenyl diisocyanate, diphenyl ether-4,4'-diisocyanate, 3,3'-ditoluene-4,4'-diisocyanate (TODI), dianisidine diisocyanate (DADI), 4,4'-diphenylmethane diisocyanate (MDI), 3,3'-dimethyl-4,4'-diphenylmethane diisocyanate, 1,5-naphthalene diisocyanate (NDI) triphenylmethane triisocyanate (TTI) and others which are used for producing polyurethanes.

Suitable polyols include polyols having a molecular weight of 500 to 8,000 and two or more hydroxyl groups such as aliphalic polyester glycols such as polyethylene adipate, polybutylene adipate and polypropylene adipate which are obtained by a condensation polymerization of an aliphalic glycol and a dicarboxylic acid; polyalkylene ether glycols such as polypropylene ether glycol and tetramethylene ether glycol which are obtained by a ring-opening polymerization of ethyleneoxide, propyleneoxide and tetrahydrofuran; polyester glycol obtained by a ring-opening polymerization of ε-caprolactone; diol obtained by hydroxylation of terminal groups of polybutadiene; copolymers of two kinds of alkyleneoxides; copolymers of two kinds of glycols and a dicarboxylic acid; polyester polyols obtained by a co-condensation polymerization of dicarboxylic acid with a polyol such as aromatic glycol, long chain diol, glycerin, trimethylol propane; and polyetherpolyols obtained by a ring-opening polymerization epoxide and ether compound such as ethyleneoxide, propyleneoxide and tetrahydrofuran with an initiator of a polyol such as glycerin, trimethylolpropane.

The polyurethane prepolymers having terminal isocyanate group are produced by reacting said polyol with excess of said polyisocyanate and can be prepolymers having terminal isocyanate groups based on a polyether or a polyester glycol. The typical prepolymers include a prepolymer obtained by reacting polytetramethylene glycol with excess of tolylenediisocyanate, a prepolymer obtained by reacting polyethylene adipate with excess of tolylenediisocyanate and a prepolymer obtained by reacting polycaprolactonediol with excess of tolylenediisocyanate.

The hardeners used in the present invention is added at a ratio of about 0.8 to 1.2 preferably 0.80 to 1.0 equivalent of a total of amino groups of the hardener and hydroxy groups of the polyols depending upon the polyols, polyisocyanate and prepolymer having terminal isocyanate groups, per 1 equivalent of isocyanate groups.

A ratio of hydroxy groups of the polyol to amino groups of the hardener can be varied in wide range and it is preferably 0.5 to 5 equivalent of hydroxy groups of the polyol per 1 equivalent of the amino groups.

The hardeners used in the present invention are solid having low melting point or liquid. Accordingly, the processability can be remarkably improved by using the hardener of the compound (I) in comparison with the use of the conventional hardeners.

Moreover, polyurethane elastomers having the balanced pot life and set time and excellent mechanical properties can be obtained by incorporating the hardener of the compound (I) of the present invention.

The present invention will be further illustrated by certain examples.

EXAMPLE 1

Synthesis of bis(2-aminophenylthioethyl)terephthalate

Reaction I:

In a 500 ml. flask equipped with a thermometer, a condenser and a stirrer, 11.2 g. (0.28 mole) of sodium hydroxide was charged and dissolved in 200 ml. of water and then, 43.5 g. (0.28 mole) of 2-nitrothiophenol and 27.4 g. (0.28×1.2 mole) of ethylenechlorohydrin were added. The mixture was heated for 2.5 hours under refluxing to react them. After the reaction, the reaction mixture was cooled to crystallize an oily product and the crystalline product was separated by a filtration and washed and dried and recrystallized from benzenepetroleum ether to obtain 50 g. of 2-hydroxyethylthionitrobenzene (yield of 89.8%).

Reaction II:

In a 1 liter flask equipped with a thermometer, a condenser, a dropping funnel and a stirrer, 27.9 g. (0.14 mole) of 2-hydroxyethylthionitrobenzene obtained in Reaction I and 17 g. (0.14×1.2 mole) of triethylamine and 250 ml. of benzene were charged and the mixture was stirred under cooling with ice and a solution of 14.2 g. (0.07 mole) of terephthaloyl chloride in 150 ml. of benzene was added dropwise under maintaining a temperature of lower than 5° C. After the addition, the mixture was kept at a room temperature for 1 hour and at 50° C. for 1 hour with stirring to react them. After the reaction, the reaction mixture was cooled and the crystal was separated by a filtration and washed with water to obtain 37.7 g. of bis(2-nitrophenylthioethyl)terephthalate (melting point of 162° to 165° C.).

Reaction III:

In the flask of Reaction II, 33.5 g. (0.06 mole) of iron powder, 4 ml. of acetic acid, 250 ml. of toluene and 80 ml. of water were charged and 26.9 g. (0.05 mole) of bis(2-nitrophenylthioethyl)terephthalate (powder) obtained in Reaction II was added under refluxing during about 1 hour and then the reaction was continued for 10 hours under refluxing. After the reaction, iron powder was separated by a filtration and the filtrate was washed with water and toluene was distilled off. The resulting crude crystal was recrystallized from toluene to obtain 20 g. of the product (yield of 85.5%).

The products were identified by a IR spectrum analysis. It was confirmed that the product in Reaction III is bis(2-aminophenylthioethyl)terephthalate.

Total yield of 65.3%
Colorless prismatic crystal
Melting point of 94° to 96° C.
Characteristic IR spectrum absorption

| | |
|---|---|
| —NH$_2$: | 3,320 cm$^{-1}$, 3,400 cm$^{-1}$ |
| 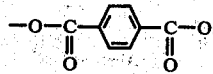 | 1,715 cm$^{-1}$ |

The yield in Reaction I is based on 2-nitrothiophenol. The yield in Reaction II is based on 2-hydroxyalkylthionitrobenzene. The yield in Reaction III is based on bis(2-nitrophenylthioalkyl)terephthalate. The total yield is based on 2-nitrothiophenol.

EXAMPLE 2

Synthesis of bis(2-aminophenylthiopropyl)terephthalate

Reaction I:

In accordance with the process of Reaction I of Example 1, 15.5 g. (0.1 mole) of 2-nitrothiophenol, 11.34 g. (0.12 mole) of 3-chloropropanol, 4.0 g. (0.1 mole) of sodium hydroxide and 150 ml. of water were used for the reaction and an oily product was extracted with benzene after the reaction and benzene was distilled off and the product was dissolved in ethanol and an insoluble 2-nitrothiophenol was separated and ethanol was distilled off to obtain 16.8 g. of 2-hydroxypropylthionitrobenzene (yield of 78.9%).

Reaction II:

In accordance with Reaction II of Example 1, 16.8 g. (0.079 mole) of 2-hydroxypropylthionitrobenzene, 16.0 g. (0.079 mole) of terephthaloyl chloride, 9.5 g. (0.079×1.2 mole) of triethylamine and 200 ml. of benzene were used for the reaction and the reaction mixture was filtered to separate trimethylamine hydrochloride after the reaction and the filtrate was concentrated and the residue was recrystallized from a small amount of benzene to obtain 16.8 g. of bis(2-nitrophenylthiopropyl)terephthalate (melting point of 125° to 128° C.) (yield of 62.0%).

Reaction III:

In accordance with Reaction III of Example 1, 16.8 g. (0.03 mole) of bis(2-nitrophenylthiopropyl)terephthalate, 20 g. (0.03×1.2 mole) of iron powder, 3 ml. of acetic acid, 250 ml. of toluene and 80 ml. of water were used for the reaction to obtain 10 g. of bis(2-aminophenylthiopropyl)terephthalate (yield of 67.2%).

Total yield of 32.9%
Colorless prismatic crystal
Melting point of 128° to 130° C.
Characteristic IR spectrum absorption

| | |
|---|---|
| —NH$_2$: | 3,310 cm$^{-1}$, 3,400 cm$^{-1}$ |
| 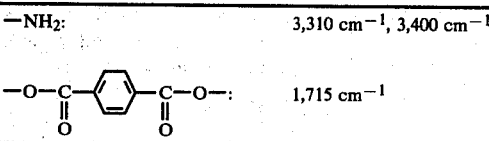 | 1,715 cm$^{-1}$ |

EXAMPLE 3

Synthesis of bis[β-(2-nitrophenylthio)-α-methyl-ethyl]-terephthalate

Reaction I:

In accordance with Reaction I of Example 1, 15.5 g. (0.1 mole) of 2-nitrothiophenol, 11.34 g. (0.12 mole) of 1-chloro-2-propanol, 4.0 g. (0.1 mole) of sodium hydroxide and 150 ml. of water were used for the reaction and an oily product was extracted with benzene after the reaction and benzene was distilled off after a dehydration to obtain 20.2 g. of blackish brawn liquid 2-(β-hydroxypropylthio)nitrobenzene (yield of 94.8%).

Reaction II:

In accordance with Reaction II of Example 1, 20.2 g. (0.095 mole) of 2-(β-hydroxypropylthio)nitrobenzene 9.64 g. (0.0475 mole) of terephthaloyl chloride, 11.5 g. (0.095×1.2 mole) of triethylamine and 150 ml. of benzene were used for the reaction and the reaction mixture was filtered to separate triethylamine hydrochloride after the reaction and benzene was distilled off from the filtrate and the product was recrystallized from benzene to obtain 19 g. of bis[β-(2-nitrophenylthio)-α-methylethyl]terephthalate (melting point of 174° to 175° C.) (yield of 73%).

Reaction III:

In accordance with Reaction III of Example 1, 17 g. (0.03 mole) of bis[β-(2-nitrophenylthio)-α-methylethyl]terephthalate, 20 g. (0.03×1.2 mole) of iron powder, 4 ml. of acetic acid and 67 ml. of water were used for the reaction to obtain 12.1 g. of bis[β-(2-aminophenylthio)-α-methyl-ethyl]terephthalate (yield of 76.6%).

EXAMPLE 4

Production of polyurethane elastomer

After melting 100 g. of bis(2-aminophenylthioethyl)-terephthalate obtained in Example 1, it was added to 21.8 g. of a prepolymer having isocyanate groups of 4.19 wt. % obtained by reacting polytetramethyleneglycol with tolylenediisocyanate (Adiprene L-100 manufactured by IE-DuPont) (ratio of —NCO:-NH of 1:0.9) which was heated at 90° C.

The reaction mixture was stirred for about 60 seconds to be homogeneous and it was poured into a mold (100 mm×250 mm×2 mm) heated to 70° C. After setting the product at 70° C. for 3 hours, it was taken out of the mold and it was heated at 100° C. for 16 hours as an after curing to obtain a polyurethane elastomer. The resulting polyurethane elastomer was aged in an atmosphere at 25° C. and a relative humidity of 50% for 6 days. Various physical properties of the polyurethane elastomer were measured by Japanese Industrial Standard K-6301. The results are shown in Table 1.

EXAMPLE 5 and 6

In accordance with the process of Example 4 except using various hardeners: bis(2-aminophenylthiopropyl)-terephthalate (Example 5) and bis[β-(2-aminophenylthio)-α-methyl-ethyl]terephthalate (Example 6), each polyurethane elastomer was produced and properties were measured. The results are shown in Table 1.

REFERENCE 1

In accordance with the process of Example 4 except using 1,2-bis(2-aminophenylthio)ethane as a hardener, a polyurethane elastomer was produced and the properties were measured. The results are shown in Table 1.

TABLE 1

|  | Example | | | Reference |
|---|---|---|---|---|
|  | 4 | 5 | 6 | 1 |
| Pot life (min.) | 11 | 12 | 10 | 6 |
| Set time (min.) | 30 | 60 | 60 | 30 |
| Physical properties | | | | |
| Hardness (Shore A) | 97 | 83 | 80 | 75 |
| Tensile strength (kg/cm$^2$) | 259 | 231 | 235 | 71 |
| Tear strength (kg/cm) | 123 | 62 | 58 | 39 |
| Rebound elasticity (%) | 51 | 48 | 47 | 38 |
| Modulus 100% (kg/cm$^2$) | 112 | 43 | 41 | 29 |
| Modulus 300% (kg/cm$^2$) | 148 | 90 | 83 | 41 |
| Elongation (%) | 560 | 530 | 500 | 450 |
| Permanent strain (%) | 34 | 41 | 28 | 45 |

EXAMPLE 7

After melting 15.0 g. of bis(2-aminophenylthioethyl)-terephthalate, it was added to 100 g. of a prepolymer having isocyanate groups of 3.0 wt. % obtained by reacting polyethyleneadipate with tolylenediisocyanate (Cyanablene A-8 manufactured by ACC) (ratio of —NCO:—NH of 1:0.9) which was heated at 70° C.

The reaction mixture was stirred for about 60 seconds to be homogeneous and it was poured into a mold and treated in accordance with the process of Example 4 so as to obtain a polyurethane elastomer. Various physical properties of the polyurethane elastomer were measured. The results are shown in Table 2.

EXAMPLE 8 and 9

In accordance with the process of Example 7 except using various hardeners: bis(2-aminophenylthiopropyl)-terephthalate (Example 8) and bis[β-(2-aminophenylthio)-α-methyl-ethyl]terephthalate (Example 9), each polyurethane elastomer was produced and properties were measured. The results are shown in Table 2.

REFERENCE 2

In accordance with the process of Example 7 except using 1,2-bis(2-aminophenylthio)ethane as a hardener, a polyurethane elastomer was produced and properties were measured. The results are shown in Table 2.

TABLE 2

|  | Example | | | Reference |
|---|---|---|---|---|
|  | 7 | 8 | 9 | 2 |
| Pot life (min.) | 21 | 25 | 20 | 10 |
| Set time (min.) | 90 | 150 | 120 | 120 |
| Physical properties | | | | |
| Hardness (Shore A) | 88 | 80 | 78 | 70 |
| Tensile strength (kg/cm$^2$) | 410 | 415 | 343 | 365 |
| Tear strength (kg/cm) | 83 | 75 | 63 | 46 |
| Rebound elasticity (%) | 47 | 49 | 43 | 35 |
| Modulus 100% (kg/cm$^2$) | 51 | 44 | 44 | 33 |
| Modulus 300% (kg/cm$^2$) | 81 | 74 | 73 | 63 |
| Elongation (%) | 750 | 700 | 720 | 730 |
| Permanent strain (%) | 52 | 60 | 55 | 80 |

We claim:

1. Bis(aminophenylthioalkyl)terephthalate having the formula

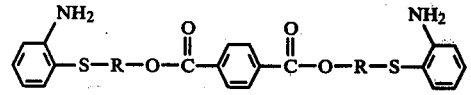

wherein R represents a C$_1$–C$_3$ alkyl group.

2. A polyurethane elastomer including as a hardener therein a hardening effective amount of a bis(aminophenylthioalkyl)terephthalate having the formula

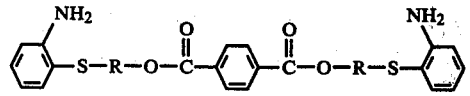

wherein R represents a C$_1$–C$_3$ alkyl group.

* * * * *